United States Patent
Whitefield et al.

(10) Patent No.: US 7,013,192 B2
(45) Date of Patent: Mar. 14, 2006

(54) SUBSTRATE CONTACT ANALYSIS

(75) Inventors: Bruce J. Whitefield, Camas, WA (US);
David A. Abarcrombie, Gresham, OR (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/867,014

(22) Filed: Jun. 14, 2004

(65) Prior Publication Data

US 2005/0278678 A1   Dec. 15, 2005

(51) Int. Cl.
*G06F 19/00* (2006.01)
(52) U.S. Cl. .................. 700/105; 700/110; 700/121
(58) Field of Classification Search ............... 700/105, 700/110, 121
See application file for complete search history.

(56) References Cited

U.S. PATENT DOCUMENTS

| | | | | |
|---|---|---|---|---|
| 5,787,190 A | * | 7/1998 | Peng et al. | 382/145 |
| 5,982,920 A | * | 11/1999 | Tobin et al. | 382/145 |
| 6,067,507 A | * | 5/2000 | Beffa | 702/118 |
| 6,185,707 B1 | * | 2/2001 | Smith et al. | 714/724 |
| 6,393,602 B1 | * | 5/2002 | Atchison et al. | 716/4 |
| 6,477,685 B1 | * | 11/2002 | Lovelace | 716/4 |
| 6,775,630 B1 | * | 8/2004 | Behkami et al. | 702/81 |
| 2002/0121915 A1 | * | 9/2002 | Montull et al. | 324/765 |
| 2003/0229410 A1 | | 12/2003 | Smith et al. | |
| 2004/0162692 A1 | | 8/2004 | Ye et al. | |
| 2005/0060336 A1 | | 3/2005 | Aberoxombie et al. | |
| 2005/0132308 A1 | * | 6/2005 | Whitefield et al. | 716/4 |

* cited by examiner

*Primary Examiner*—Evan Pert
(74) *Attorney, Agent, or Firm*—Luedeka, Neely & Graham, P.C.

(57) ABSTRACT

A method of analyzing substrate yield, where a substrate yield map and a substrate contact map are selected and overlaid to produce a composite map. First elements of the substrate yield map are compared to second elements of the substrate contact map to determine a degree of correlation between the first elements and the second elements. Additional substrate contact maps are repeatedly selected and the first elements of the substrate yield map are compared to the second elements of the additional substrate contact maps, and a degree of correlation between the first elements and each of the second elements for the additional substrate contact maps is determined and reported. The composite map having a highest degree of correlation between the first elements and the second elements is presented, and all composite maps that have at least a desired degree of correlation between the first elements and the second elements are presented.

20 Claims, 4 Drawing Sheets

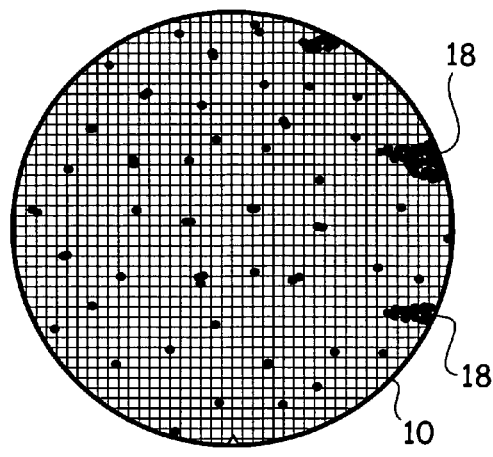
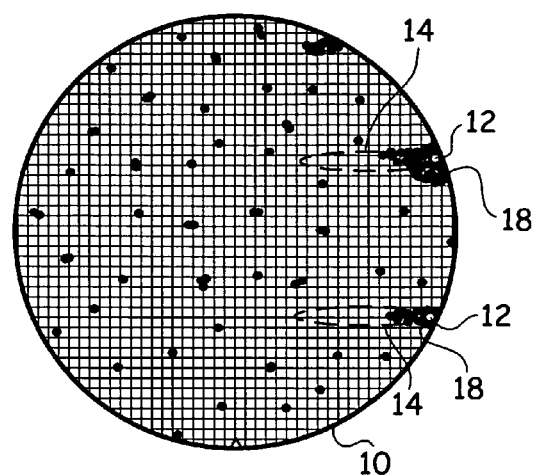
Fig. 2A                Fig. 2B
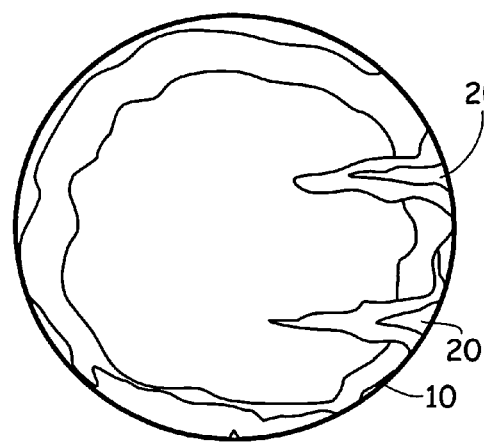
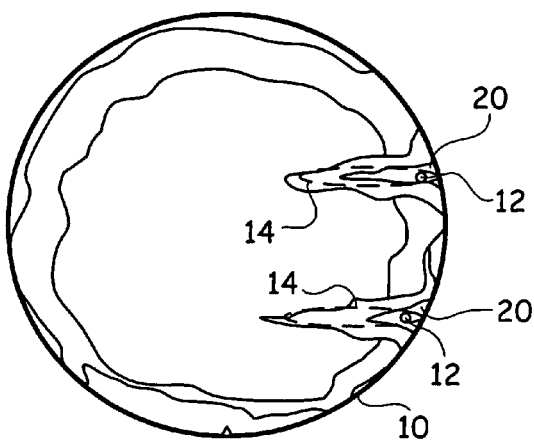
Fig. 2C                Fig. 2D

SUBSTRATE CONTACT ANALYSIS

FIELD

This invention relates to the field of substrate processing. More particularly, this invention relates to using contact point information to identify and correct substrate processing problems.

BACKGROUND

Modern integrated circuits are extremely complex devices that are fabricated using equally complex processes. As the term is used herein, "integrated circuit" includes devices such as those formed on monolithic semiconducting substrates, such as those formed of group IV materials like silicon or germanium, or group III–V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices. Because of the complexity of integrated circuits and the processes by which they are formed, it can be extremely difficult to determine the reasons why some devices function properly and other devices function improperly, or fail altogether.

Integrated circuits are typically manufactured on thin silicon substrates, commonly referred to as wafers. The wafer is divided up onto smaller rectangular sections for each device, typically known as the die or device. The methods and other embodiments according to the present invention can be applied to processes that are performed on other substrates to make other devices or components, such as flat panel display manufacturing, which is performed on rectangular glass substrates. Thus, this disclosure generally refers to substrates, substrate profiles, and substrate contact points, even though silicon wafer processing may be the most common application for the embodiments of the invention. It is appreciated that the same or similar methods are just as applicable to the analysis of a wide variety of substrates. Wafer test yield of die, or simply yield, is predominantly used as an example herein of an important dependent variable of interest. However, it is appreciated that any other dependent variable that is spatially associated with the substrate can also be used.

One method to assist in failure analysis is mapping important variables, such as yield, according to the position at which the variable is read on the substrate. Wafer mapping, for example, has traditionally been done by plotting the pass/fail data (i.e. yield) or other variable of interest versus the die position on the wafer. These wafer maps can be enhanced by combining values from many wafers in what is known as a stacked map. Recently there have been improvements in substrate mapping that can combine data from many wafers and many devices into what is known as a high-resolution wafer profile. Such substrate profiles are created from databases of information that is associated with substrates. A graphical representation is developed from the information, which representation depicts the yield or other variable read from the devices on the substrate, according to their position on the substrate. Substrate profiles such as these look somewhat like a topographical map, where the various contours of the profile delineate areas of different average (or otherwise computed) yield or other measured variable of interest for the devices bounded by those contours on the substrates. The methods described herein can be used with standard wafer maps or stacked wafer maps. However, use with substrate profiles is preferred.

The existing method of overcoming this problem is for the engineers to review the substrate profile map and see if they recognize within it a pattern they have seen elsewhere. If they do not recognize the pattern, then they may pass around a picture of the substrate profile to other engineers, and hope that someone recognizes a possible cause. In any case, connecting a substrate pattern with a physical cause depends on whether such a problem has been seen and resolved before, and someone remembers the incident and can connect the pattern in the substrate profile with the previous problem.

The problem with the current approach is that there is a low likelihood of making the connection between a pattern in the substrate profile and the possible causes that may be due to physical contact or near contact of the substrate with processing equipment. This can be due to a variety of reasons, such as the person reviewing the substrate profile not being aware of a previous issue, or not being aware of how process equipment contacts the substrate.

What is needed, therefore, is a system for constructing, using, and interpreting substrate profiles and other maps that reduces some of the problems mentioned above.

SUMMARY

The above and other needs are met by a system for analyzing substrate yield. Means are provided for selecting a substrate yield map, and for selecting a substrate contact map. Means are used for overlaying the substrate yield map and the substrate contact map and producing a composite map.

In this manner, the preferred embodiments of the present invention enable the user to quickly identify whether a substrate contact or proximity effect as depicted in a substrate contact map is responsible for a specific pattern in a substrate yield or profile map. The embodiments of the present invention thus enable automatic comparisons, where a user's attention is directed to only those comparisons that have a high degree of matching. The embodiments of the invention preferably provide data about the nature of each contact or proximity effect to facilitate identification and analysis of pattern changes. The various embodiments of the invention contemplate an apparatus and a method to capture prior learning about patterns that are caused by substrate contact or proximity effects, so that they can be monitored and controlled.

In various embodiments, means are provided for comparing first elements of the substrate yield map to second elements of the substrate contact map and determining a degree of correlation between the first elements and the second elements. Means are preferably used to report the degrees of correlation between the first elements and the second elements. In some embodiments, means present the composite map having a highest degree of correlation between the first elements and the second elements. Means may also be used for presenting all composite maps that have at least a desired degree of correlation between the first elements and the second elements.

The substrate contact map is preferably stored in a database of substrate contact maps. Preferably, the substrate contact map is associated with contact information that describes characteristics of the contact map, where the characteristics preferably include at least one of contact location(s) identification, contact type, contact material, contact vector, contact pressure, and examples of known impacts on substrate yield profiles. Most preferably, the substrate contact map and the contact information are stored in a common database.

According to another aspect of the present invention there is described a system for analyzing substrate yield. Means are provided for selecting a substrate yield map having first elements in first positions according to a coordinate position system, and for selecting a substrate contact map having second elements in second positions according to the coordinate position system. Means are used for overlaying the substrate yield map and the substrate contact map, and producing a composite map including both the first elements and the second elements according to the coordinate position system. Means compare the first positions of the first elements to the second positions of the second elements, and determine a degree of correlation between the first elements and the second elements. Means are repeatedly used for selecting additional substrate contact maps, and comparing the first positions of the first elements of the substrate yield map to the second positions of the second elements of the additional substrate contact maps, and determining a degree of correlation between the first elements and each of the second elements for the additional substrate contact maps. The degrees of correlation between the first elements and the second elements are reported, and means are used to present all composite maps that have at least a desired degree of correlation between the first elements and the second elements.

In various embodiments of this aspect of the invention, the substrate contact map is associated with contact information that describes characteristics of the contact map. The characteristics preferably include at least one of contact location(s) identification, contact type, contact material, contact vector, and contact pressure. The substrate contact map and the contact information are preferably stored in a common database.

According to yet another aspect of the invention there is described a method of analyzing substrate yield, where a substrate yield map and a substrate contact map are selected and overlaid to produce a composite map.

In various embodiments, first elements of the substrate yield map are compared to second elements of the substrate contact map to determine a degree of correlation between the first elements and the second elements. Preferably, additional substrate contact maps are repeatedly selected and the first elements of the substrate yield map are compared to the second elements of the additional substrate contact maps, and a degree of correlation between the first elements and each of the second elements for the additional substrate contact maps is determined and reported. In some embodiments the composite map having a highest degree of correlation between the first elements and the second elements is presented, and in some embodiments all composite maps that have at least a desired degree of correlation between the first elements and the second elements are presented.

Preferably, the substrate contact map is stored in a database of substrate contact maps. The substrate contact map is preferably associated with contact information that describes characteristics of the contact map, where the characteristics preferably include at least one of contact location identification, contact type, contact material, contact vector, and contact pressure. The substrate contact map and the contact information are stored in a common database.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 2A depicts a defect inspection map.

FIG. 2B depicts the defect inspection map of FIG. 2A overlaid with a contact map.

FIG. 2C depicts a substrate yield profile map.

FIG. 2D depicts the substrate yield profile map of FIG. 2C overlaid with a contact map.

DETAILED DESCRIPTION

This invention pertains to how substrate profiles are overlaid with information on where the substrate is physically contacted or nearly contacted during processing, so that the impact of those events can be better understood. As used herein, the term "contact" generally includes actual physical contact and near proximity of physical objects with the substrate, even though such proximate objects may not actually physically contact the substrate. However, in other instances both actual physical contact and proximity are separately described.

The ability to identify unique substrate profile patterns and associate the patterns with contact sources in the process equipment is enhanced through the use of a pattern database that can overlay substrate profiles and maps with maps of the contact points. This approach enables the user to quickly compare patterns to possible sources, and narrow the possibilities down to a few candidate operations. To facilitate further analysis, the database preferably contains additional information about the contact, such as the identification of the equipment making the contact, the material contacting the substrate, the shape of the contacting object, and examples of known issues that can be caused by the contact. By using pattern recognition algorithms it is also possible to automate the pattern correlation so that engineers are automatically notified of possible pattern matches.

One of the important elements of the invention is to combine substrate profile or substrate mapping information with physical contact or proximity information in a database system using a common coordinate system. It is appreciated that in many instances herein, the term "map" includes both maps and profiles as described above. It is also appreciated that the term "yield" as used herein generally includes a variety of concepts in addition to pass/fail yield, such as reliability data, customer return data, and final test data, to name a few.

Figure 1A:
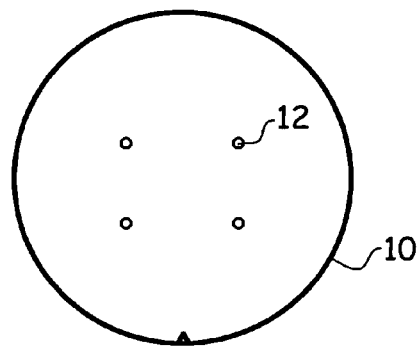
FIGS. 1A through 1D depict contact maps that show contact and proximity points on the substrates that are process through various pieces of processing equipment.
Figure 1B:
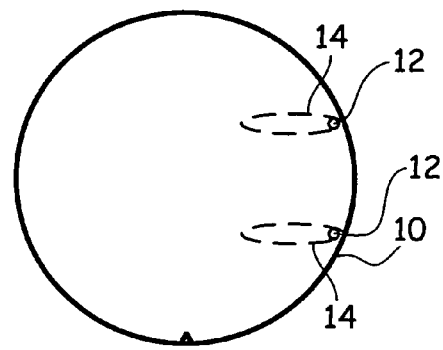
Figure 1C:
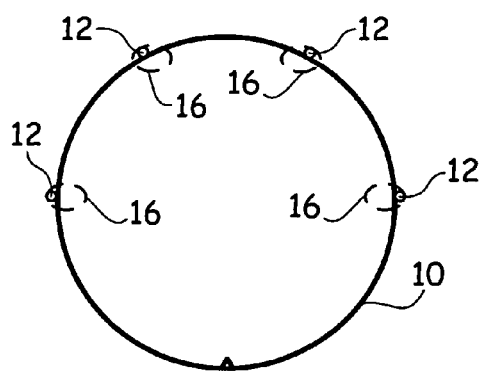

FIGS. 1A through 1D depicts examples of substrate contact maps. FIG. 1A depicts substrate backside contact points 12, as viewed from front of the substrate 10. FIG. 1B depicts chemical mechanical polishing water jet contact points, where the spots 12 show direct contact, and the ellipses 14 show diffuse contact. FIG. 1C depicts the contact points 12 from nitride deposition furnace substrate carriers. The contact points 12 are on the edge of the substrate 10.

Figure 1D:
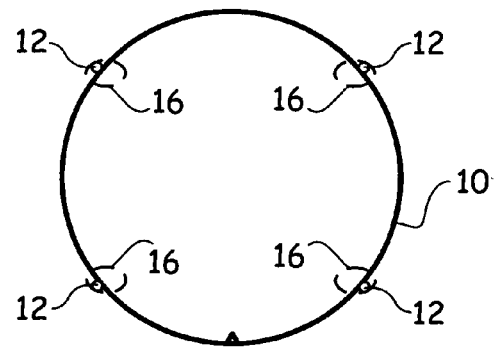

Zones 16 depict where the carrier overlaps the edge of the substrate 10, and thus might, in some instances, represent proximity points rather than actual physical contact points. FIG. 1D depicts the contact points 12 from polysilicon deposition furnace substrate carriers. The contact points 12 are on the edge of the substrate 10. Zones 16 depict where the carrier overlaps the edge of the substrate 10, and thus might, in some instances, represent proximity points rather than actual physical contact points.

According to the preferred embodiment of the present invention, the contact point diagrams as depicted in FIGS. 1A through 1D are overlaid with other substrate maps, such as substrate yield profiles, inspection maps, or maps using other measurements, all of which are generally and collectively referred to as substrate yield maps herein. FIG. 2A depicts a defect map for a substrate 10, where defects 18 are depicted relative to the devices on the substrate 10. FIG. 2B depicts the contact diagram of chemical mechanical polishing water jets 12 and 14 from FIG. 1B overlaid with the inspection defect map of FIG. 2A. The overlay depicted in FIG. 2B makes it clear that there is a good correlation of defect locations 18 with the contact points 12 and 14.

The same contact diagram as depicted in FIG. 1B can be overlaid with other substrate mapping techniques as well. FIG. 2c depicts a yield profile map with regions 20 on the substrate 10 that have a reduced yield. FIG. 2D depicts the yield profile map of FIG. 2C overlaid with the water jet contact map of FIG. 1B. Again, it can be seen that there is a good correlation between the contact points 12 and 14 and the areas of historical reduced yield 20.

Figure 3A:
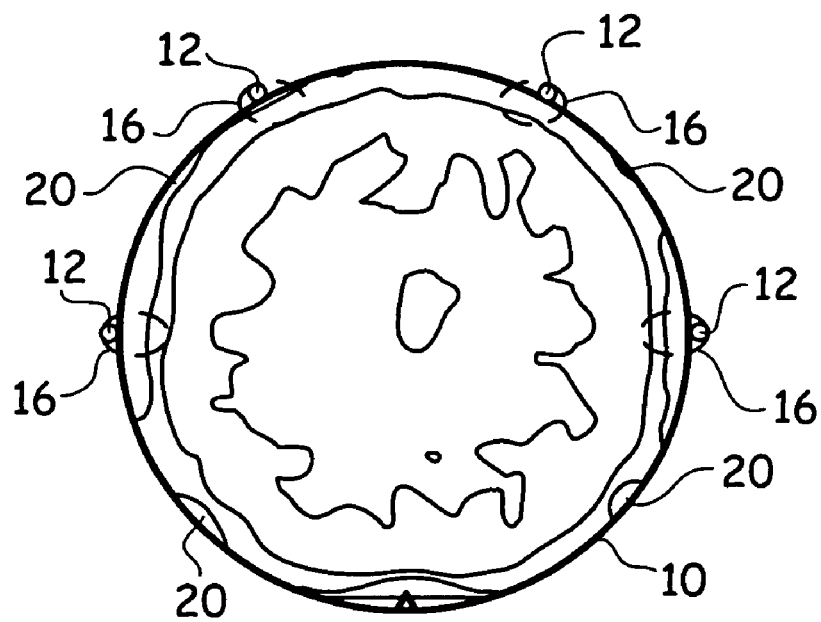
FIGS. 3A through 3B depict substrate yield profile maps overlaid with two different contact maps.
Figure 3B:
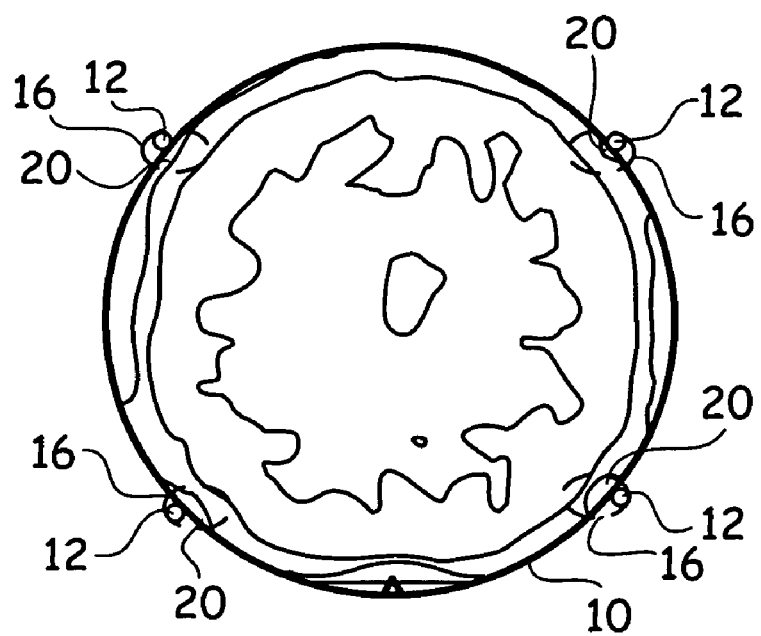

This overlay capability and database approach enables users to quickly eliminate operations that are not responsible for a substrate pattern, and focus their attention predominantly on the operations that are strong candidates for the condition under review. FIGS. 3A and 3B depict the overlay comparisons of two furnace process contact points with a substrate yield profile map 10. In the case depicted in FIG. 3A, the nitride deposition furnace contact map from FIG. 1C provides a relatively poor match between the contact points 12 and 16 and the regions of reduced yield 20. However, the polysilicon deposition furnace contact map from FIG. 1D provides a relatively good match between the contact points 12 and 16 and the regions of reduced yield 20 on the right side of the substrate 10.

Automation

The system as described herein can be implemented in a variety of ways, such as by a user looking at overlaid maps to identify matching patterns. However, since the map information is preferably stored in a database with a common coordinate system, it is preferred to compare the degree of matching between contact diagrams and inspection and profile yield maps in an automated fashion using one or more various pattern recognition techniques. There are many possible comparison algorithms that are published in the literature on pattern recognition. The advantage of the automated method is that many thousands of substrate yield maps and contact map combinations can be quickly compared on a regular basis by the data system, and only those with a high degree of matching are preferably flagged for additional attention by the engineer.

Additional Contact Information

Once a substrate profile and contact map pair provides a desired, and preferably selectable, degree of matching, the next step is preferably to further analyze the nature of the impact or defect that is causing the yield profile. To this end, it is useful to have additional data about the nature of the contact associated with the contact diagram in the database. Thus, there is preferably a wide variety of information that is used for this analysis process, including: 1) the identification of the process tool associated with the contact diagram, 2) the process steps used with the tool with the contact diagram, 3) the material disposed at the contact point, such as quartz, Teflon, aluminum, etc., 4) the nature of the contact mode, such as static contact or rubbing contact, 5) the contact vector, meaning the direction of contact pressure, 6) normal contact pressure, 7) a detailed diagram of the contacting hardware in both cross sectional and plan views, 8) examples of defects that are known to be caused by this contact. The examples themselves preferably include many points of information, such as defect substrate maps, images of the defect, description of defect, composition of defect, and what the root cause of the defect was. 9) Examples of substrate profile patterns and parameters that have been known to result from this contact.

The above list is only an example of the associated information that is useful for an analysis of the profile. Other data types are added if they are useful for identifying or troubleshooting the cause of substrate yield map patterns.

The method as described herein can be implemented in a variety of different ways. Although the system can be implemented manually, where the substrate profiles are manually computed and stored, such a system would tend to be at the lower end of the range of utility that can be provided by the system. Alternately, the system can be implemented as a dedicated hardware and software system, capable only of producing the substrate profiles and tables as described herein. Most preferably, however, the system is implemented on a general computing platform, such as a personal computer. In various embodiments, the system is distributed across a computer network, with various functional units of the system disposed on different physical platforms that are all logically coupled through the network.

Figure 4:
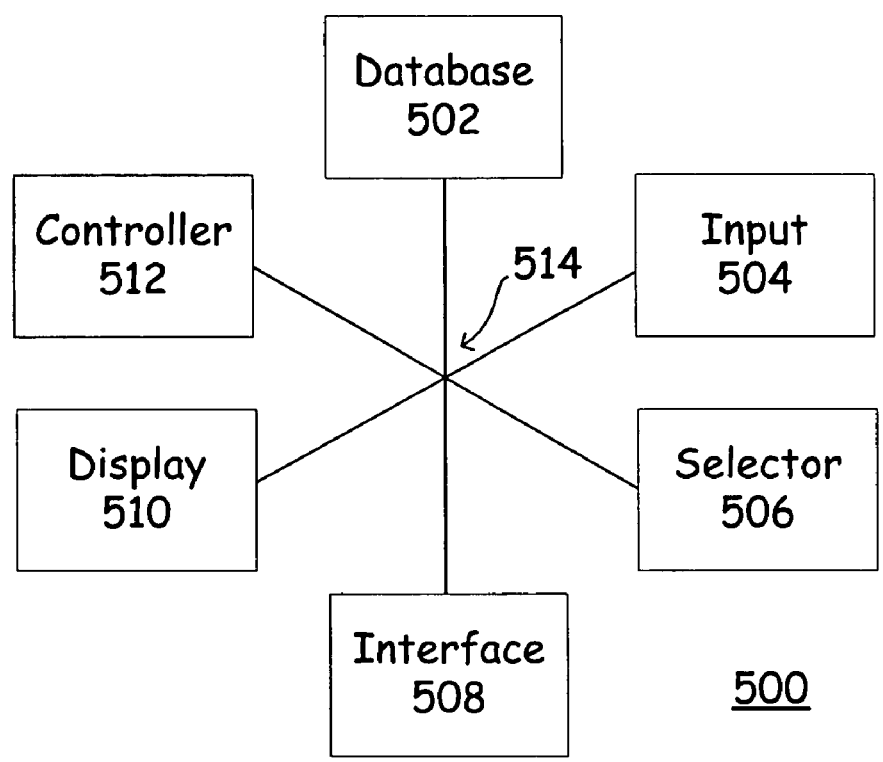
FIG. 4 is a functional block diagram of a system according to a preferred embodiment of the present invention.

FIG. 4 depicts a functional block diagram of a preferred embodiment of the system 500 according to the present invention. The system 500 preferably includes a database 502 that contains all of the information as described above. An input 504 provides for communication between the various elements of the system 500, such as communication to the database 502. A selector 506 selects various combinations of maps that are resident in the database 502. In some embodiments, the selections are made such as through a human interface 508, such as a mouse or a keyboard. The overlays and other information and controls are preferably presented such as on a display 510. A controller 512 is preferably programmed to construct the overlays as described above.

In summary, the preferred embodiments of the present invention combine substrate map and substrate contact point diagrams using a common coordinate system for overlay analysis. Substrate map and substrate proximity area diagrams are also combined using a common coordinate system for overlay analysis. A library of substrate contact points and proximity areas are stored in a database system, which preferably also includes data for other types of substrate maps, so that many different contact point or proximity area diagrams can be quickly overlaid with many different types of substrate yield maps. The overlay comparison is preferably automatic, so that many maps can be checked regularly and the user's attention is preferably called only to the ones with a selectable high degree of matching. Additional information is preferably included in the database in regard to the substrate contact points, to facilitate identification and analysis.

The preferred embodiments of the present invention enable the user to quickly identify whether a substrate contact or proximity effect is responsible for a specific substrate profile or pattern on a substrate yield map. The embodiments of the invention thus enable automatic comparisons, so that a user's attention is preferably directed to only those comparisons that have a high degree of matching. The embodiments of the invention preferably provide data about the nature of each contact or proximity effect to facilitate identification and analysis of pattern changes. The various embodiments of the invention contemplate an apparatus and a method to capture prior learning about patterns that are caused by substrate contact or proximity effects, so that they can be monitored and controlled.

There are many different ways to structure such a database and user interface, but all such preferably contain the relevant data, utilize a common scale, and provide a way to compare substrate maps. Instead of using a common coordinate system in all embodiments, maps could be overlaid by matching image magnification. This approach allows users to do overlay comparisons, but would not readily facilitate automation. This invention can be applied to all types of substrates in addition to semiconductor substrates, where similar information exists to generate maps and contact diagrams. One additional example of such is flat panel displays.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A system for analyzing substrate yield, the system comprising:
   means for selecting a substrate yield map,
   means for selecting a substrate contact map, and
   means for overlaying the substrate yield map and the substrate contact map and producing a composite map.

2. The system of claim 1, further comprising means for comparing first elements of the substrate yield map to second elements of the substrate contact map and determining a degree of correlation between the first elements and the second elements.

3. The system of claim 1, further comprising:
   means for comparing first elements of the substrate yield map to second elements of the substrate contact map and determining a degree of correlation between the first elements and the second elements, and
   means for repeatedly selecting additional substrate contact maps, and comparing the first elements of the substrate yield map to the second elements of the additional substrate contact maps, and determining a degree of correlation between the first elements and each of the second elements for the additional substrate contact maps, and reporting the degrees of correlation between the first elements and all sets of the second elements.

4. The system of claim 1, further comprising:
   means for comparing first elements of the substrate yield map to second elements of the substrate contact map and determining a degree of correlation between the first elements and the second elements,
   means for repeatedly selecting additional substrate contact maps, and comparing the first elements of the substrate yield map to the second elements of the additional substrate contact maps, and determining a degree of correlation between the first elements and each of the second elements for the additional substrate contact maps, and reporting the degrees of correlation between the first elements and the second elements, and
   means for presenting the composite map having a highest degree of correlation between the first elements and the second elements.

5. The system of claim 1, further comprising:
   means for comparing first elements of the substrate yield map to second elements of the substrate contact map and determining a degree of correlation between the first elements and the second elements,
   means for repeatedly selecting additional substrate contact maps, and comparing the first elements of the substrate yield map to the second elements of the additional substrate contact maps, and determining a degree of correlation between the first elements and each of the second elements for the additional substrate contact maps, and reporting the degrees of correlation between the first elements and the second elements, and
   means for presenting all composite maps that have at least a desired degree of correlation between the first elements and the second elements.

6. The system of claim 1, wherein the substrate contact map is stored in a database of substrate contact maps.

7. The system of claim 1, wherein the substrate contact map is associated with contact information that describes characteristics of the contact map.

8. The system of claim 1, wherein the substrate contact map is associated with contact information that describes characteristics of the contact map, where the characteristics include at least one of contact location, contact type, contact material, contact vector, and contact pressure.

9. The system of claim 1, wherein the substrate contact map is associated with contact information that describes characteristics of the contact map, and the substrate contact map and the contact information is stored in a common database.

10. A system for analyzing substrate yield, the system comprising:
    means for selecting a substrate yield map having first elements in first positions according to a coordinate position system,
    means for selecting a substrate contact map having second elements in second positions according to the coordinate position system,
    means for overlaying the substrate yield map and the substrate contact map and producing a composite map including both the first elements and the second elements according to the coordinate position system,
    means for comparing the first positions of the first elements to the second positions of the second elements and determining a degree of correlation between the first elements and the second elements,
    means for repeatedly selecting additional substrate contact maps, and comparing the first positions of the first elements of the substrate yield map to the second positions of the second elements of the additional substrate contact maps, and determining a degree of correlation between the first elements and each of the second elements for the additional substrate contact maps, and reporting the degrees of correlation between the first elements and sets of the second elements, and means for presenting all composite maps that have at least a desired degree of correlation between the first elements and the second elements.

11. The system of claim 10, wherein the substrate contact map is associated with contact information that describes characteristics of the contact map, where the characteristics include at least one of contact identification, contact type, contact material, contact vector, and contact pressure, and the substrate contact map and the contact information are stored in a common database.

12. A method of analyzing substrate yield, the method comprising the steps of:

selecting a substrate yield map, selecting a substrate contact map, and overlaying the substrate yield map and the substrate contact map and producing a composite map.

13. The method of claim 12, further comprising the steps of comparing first elements of the substrate yield map to second elements of the substrate contact map and determining a degree of correlation between the first elements and the second elements.

14. The method of claim 12, further comprising the steps of:

comparing first elements of the substrate yield map to second elements of the substrate contact map and determining a degree of correlation between the first elements and the second elements, and repeatedly selecting additional substrate contact maps, and comparing the first elements of the substrate yield map to the second elements of the additional substrate contact maps, and determining a degree of correlation between the first elements and each of the second elements for the additional substrate contact maps, and reporting the degrees of correlation between the first elements and sets of the second elements.

15. The method of claim 12, further comprising the steps of:

comparing first elements of the substrate yield map to second elements of the substrate contact map and determining a degree of correlation between the first elements and the second elements, repeatedly selecting additional substrate contact maps, and comparing the first elements of the substrate yield map to the second elements of the additional substrate contact maps, and determining a degree of correlation between the first elements and each of the second elements for the additional substrate contact maps, and reporting the degrees of correlation between the first elements and the second elements, and presenting the composite map having a highest degree of correlation between the first elements and the second elements.

16. The method of claim 12, further comprising the steps of:

comparing first elements of the substrate yield map to second elements of the substrate contact map and determining a degree of correlation between the first elements and the second elements, repeatedly selecting additional substrate contact maps, and comparing the first elements of the substrate yield map to the second elements of the additional substrate contact maps, and determining a degree of correlation between the first elements and each of the second elements for the additional substrate contact maps, and reporting the degrees of correlation between the first elements and the second elements, and presenting all composite maps that have at least a desired degree of correlation between the first elements and the second elements.

17. The method of claim 12, wherein the substrate contact map is stored in a database of substrate contact maps.

18. The method of claim 12, wherein the substrate contact map is associated with contact information that describes characteristics of the contact map.

19. The method of claim 12, wherein the substrate contact map is associated with contact information that describes characteristics of the contact map, where the characteristics include at least one of contact location identification, contact type, contact material, contact vector, and contact pressure.

20. The method of claim 12, wherein the substrate contact map is associated with contact information that describes characteristics of the contact map, and the substrate contact map and the contact information are stored in a common database.

* * * * *

UNITED STATES PATENT AND TRADEMARK OFFICE
CERTIFICATE OF CORRECTION

| | | |
|---|---|---|
| PATENT NO. | : 7,013,192 B2 | Page 1 of 1 |
| APPLICATION NO. | : 10/867014 | |
| DATED | : March 14, 2006 | |
| INVENTOR(S) | : Bruce J. Whitefield and David A. Abercrombie | |

It is certified that error appears in the above-identified patent and that said Letters Patent is hereby corrected as shown below:

Title page, (75), line 2, change "Abarcrombie" to "Abercrombie".

Signed and Sealed this

First Day of August, 2006

JON W. DUDAS
*Director of the United States Patent and Trademark Office*